United States Patent

Kanda

[11] Patent Number: 5,991,121
[45] Date of Patent: *Nov. 23, 1999

[54] HEAD ASSEMBLY HAVING SHORT CIRCUIT PATTERN SHORT-CIRCUITING A PAIR OF LEAD LINES

[75] Inventor: Eiichi Kanda, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/905,327

[22] Filed: Aug. 4, 1997

[30] Foreign Application Priority Data

Feb. 24, 1997 [JP] Japan .................................. 9-039553

[51] Int. Cl.$^6$ .............................. G11B 5/40; G11B 5/58
[52] U.S. Cl. ........................................ 360/104; 360/113
[58] Field of Search ..................... 360/103, 104, 360/108, 113, 126

[56] References Cited

U.S. PATENT DOCUMENTS

| | | | |
|---|---|---|---|
| 4,317,149 | 2/1982 | Elser et al. | 360/126 |
| 5,465,186 | 11/1995 | Bajorek et al. | 360/113 |
| 5,467,881 | 11/1995 | Gill | 216/22 |
| 5,491,605 | 2/1996 | Hughbanks et al. | 360/113 |
| 5,539,598 | 7/1996 | Denison et al. | 360/113 |
| 5,615,072 | 3/1997 | Hofsass et al. | 361/24 |
| 5,638,237 | 6/1997 | Phipps et al. | 360/128 |
| 5,644,454 | 7/1997 | Arya et al. | 360/106 |
| 5,699,212 | 12/1997 | Erpelding et al. | 360/104 |
| 5,710,682 | 1/1998 | Arya et al. | 360/106 |
| 5,754,355 | 5/1998 | Nakamura et al. | 360/73.03 |
| 5,759,428 | 6/1998 | Balamane et al. | 2319/121.66 |

FOREIGN PATENT DOCUMENTS

| | | |
|---|---|---|
| 4366409 | 12/1992 | Japan . |
| 7141636 | 6/1995 | Japan . |
| 8167123 | 6/1996 | Japan . |
| 8315321 | 11/1996 | Japan . |

*Primary Examiner*—Jefferson Evans
*Attorney, Agent, or Firm*—Greer, Burns & Crain, Ltd.

[57] ABSTRACT

A head assembly includes a suspension, a head slider having a magnetoresistive element mounted on a tip end of the suspension, and a pair of lead lines disposed on the suspension and having ends connected to the magnetoresistive element. The head assembly also has an easily breakable short circuit pattern disposed on the suspension and connecting said lead lines to each other. When the head assembly is handled by itself, because the lead lines are short-circuited by the short circuit pattern, a current produced due to an electrostatic charge buildup flows through the short circuit pattern and is prevented from flowing through the magnetoresistive element. After the head assembly is installed on an actuator arm, the short circuit pattern is broken, electrically disconnecting the lead lines from each other.

12 Claims, 12 Drawing Sheets

F I G. 3
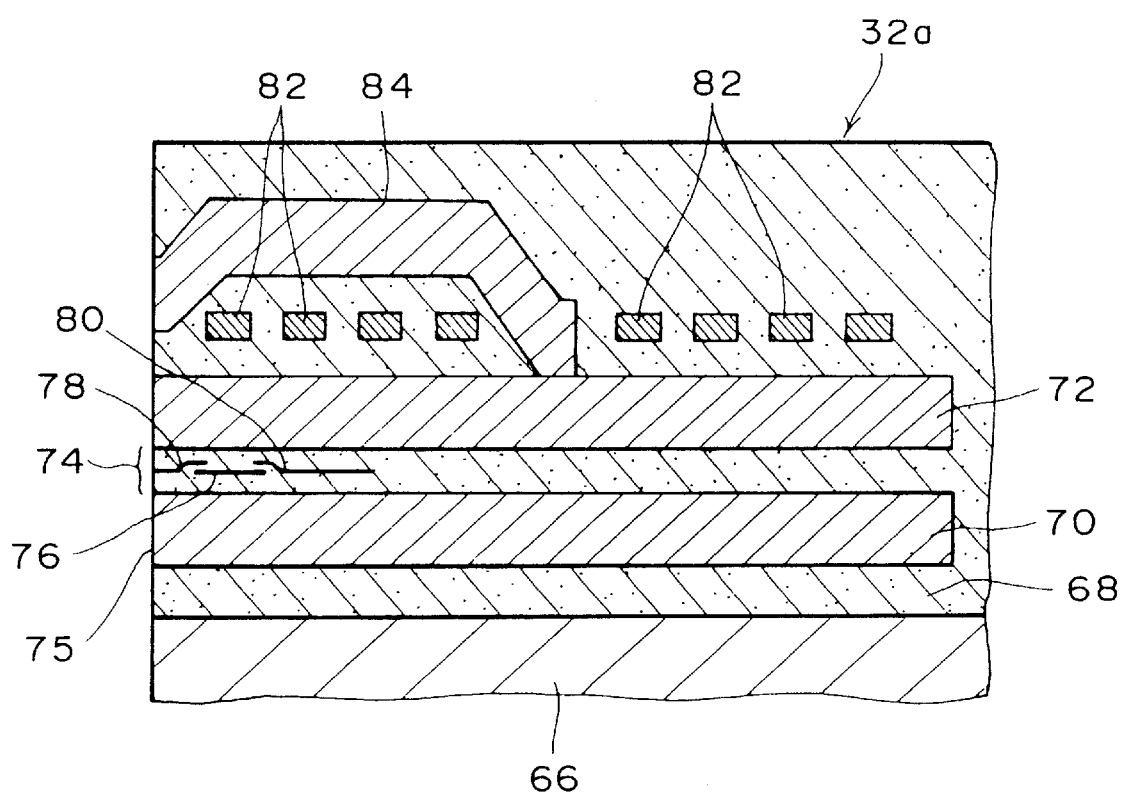

HEAD ASSEMBLY HAVING SHORT CIRCUIT PATTERN SHORT-CIRCUITING A PAIR OF LEAD LINES

BACKGROUND OF THE INVENTION

1. Field of the Invention

The present invention relates to a head assembly and a magnetic disk drive having the head assembly.

2. Description of the Related Art

As magnetic disk drives have become smaller in size and greater in data storage density in recent years, the distance that a head slider floats off the magnetic disk is so reduced that there has been a demand for a magnetic disk drive in which a head slider floats off the magnetic disk a very small distance or is held in contact with the magnetic disk for contact recording/reproduction. Conventional magnetic induction heads suffer a degraded reproduction output capability if the peripheral speed, i.e., the relative speed between the head and the magnetic disk, is lowered due to a reduced magnetic disk diameter. It has been desired in the art to develop a magnetoresistive head (hereinafter referred to as an MR head) whose reproduction output capability does not depend on the peripheral speed and which is capable of producing a high reproduced output at low peripheral speeds.

The MR head operates by supplying a constant sense current to a magnetoresistive element (MR element), converting a change in the magnitude of a signal magnetic field leaking from a recording track on a recording medium into a change in the resistance of the MR head, and reproducing information recorded on the recording medium as a voltage change. The MR head generally has the MR element formed integrally with a head slider according to a thin-film fabrication process. The slider has a data-writing coil and is mounted by bonding or the like on the tip end of a suspension which is made of stainless steel.

Leads which connect the MR element and the data-writing coil to a recording/reproducing circuit of the magnetic disk drive are constructed as a copper pattern printed on the suspension. When the suspension is mounted on the tip end of an actuator arm, the MR element and the data-writing coil are electrically connected to the recording/reproducing circuit through a flexible printed circuit (FPC) or the like.

With a suspension which supports a conventional MR head slider, a pair of leads connected to terminals of the MR element or these leads and a ground line connected to a magnetic shield of the MR element are electrically disconnected from each other. Therefore, when the worker who is electrostatically charged handles the suspension with the MR head slider supported thereon or carries the suspension in an easily electrostatically chargeable casing made of synthetic resin or the like, an excessive current due to an electrostatic charge tends to flow into the MR element, damaging the MR element, or an electrostatic charge between the MR element and the magnetic shield is liable to be discharged, burning out the MR element.

SUMMARY OF THE INVENTION

It is therefore an object of the present invention to provide a head assembly which prevents an MR element from being burned out due to an electrostatic charge buildup.

In accordance with an aspect of the present invention, there is provided a head assembly comprising a suspension, a head slider having a magnetoresistive element mounted on a tip end of the suspension, a pair of lead lines disposed on the suspension and having ends connected to the magnetoresistive element, and a short circuit pattern disposed on the suspension and connecting the lead lines to each other.

If the head assembly also has a ground line disposed on the suspension and connected to a magnetic shield of the magnetoresistive element, then the short circuit pattern connects the lead lines to each other and to the ground line. Preferably, the short circuit pattern is made of an easily removable material such as a solder material having a low melting point or an alloy having a low melting point.

In accordance with another aspect of the present invention, there is provided a head assembly comprising a suspension, a head slider having a magnetoresistive element mounted on a tip end of the suspension, a pair of lead lines disposed on the suspension and having ends connected to the magnetoresistive element, and a switch disposed on the suspension for selectively connecting the lead lines to each other and disconnecting the lead lines from each other.

Preferably, the switch is made of a bimetal for being held against the lead lines at a room temperature thereby to connect the lead lines to each other.

In accordance with a further aspect of the present invention, there is provided a magnetic disk drive comprising a housing, a magnetic disk rotatably mounted in the housing, a head slider having a magnetoresistive element for reading data from the magnetic disk, and an actuator for moving the head slider across tracks on the magnetic disk, the actuator comprising an actuator arm rotatably mounted in the housing and a suspension supporting the head slider on a tip end thereof and having a proximal end fixed to a tip end of the actuator, the actuator arm having a tooth on the tip end thereof, the suspension having a pair of lead lines having respective ends connected to the magnetoresistive element, a hole defined therein for insertion of the tooth therein, and a short circuit pattern for normally short-circuiting the lead lines, the short circuit pattern being breakable by the tooth when the tooth is inserted into the hole, thereby electrically disconnecting the lead lines from each other.

The suspension may have, rather than the short circuit pattern, a short circuit switch for normally short-circuiting the lead lines, the short circuit switch being displaceable by the tooth when the tooth is inserted into the hole, thereby electrically disconnecting the lead lines from each other.

The above and other objects, features, and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a fragmentary cross-sectional view of an MR head of each of the head assemblies;

DESCRIPTION OF THE PREFERRED EMBODIMENTS

Figure 1:
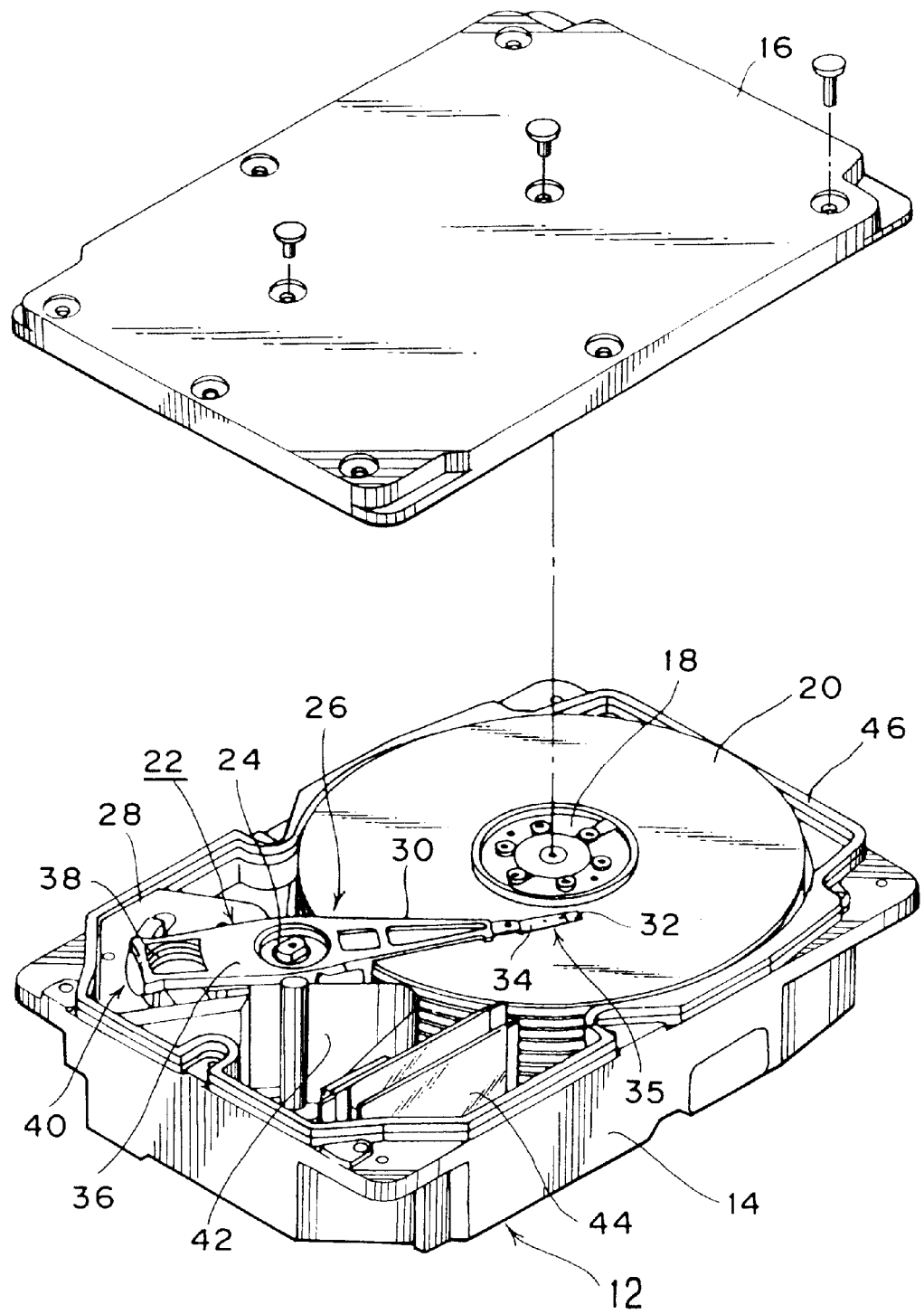
FIG. 1 is an exploded perspective view of a magnetic disk drive equipped with head assemblies according to a first embodiment of the present invention.

Like or corresponding parts are denoted by like or corresponding reference numerals throughout views. FIG. 1 shows in exploded perspective view of a magnetic disk drive equipped with head assemblies according to a first embodiment of the present invention.

As shown in FIG. 1, the magnetic disk drive has a housing (disk enclosure) 12 comprising a base 14 and a cover 16. The base 14 supports thereon a spindle hub (not shown) rotatable by an inner hub motor. Magnetic disks 20 alternating with spacers (not shown) are mounted on the spindle hub, and fastened to the spindle hub by a disk clamp 18. The magnetic disks 20 thus mounted on the spindle hub are spaced along the spindle hub by the spacers.

A rotary actuator 22 comprises an actuator arm assembly 26 and a magnetic circuit 28. The actuator arm assembly 26 is rotatably mounted on a shaft 24 fixedly mounted on the base 14. The actuator arm assembly 26 includes a plurality of actuator arms 30 extending in one direction from the shaft 24 and a coil support 36 extending away from the actuator arms 30.

The actuator arms 30 support respective head assemblies 35 according to a first embodiment of the present invention on their respective tip ends. Each of the head assemblies 35 comprises a head slider 32 and a suspension 34 which supports the head slider 32 on its tip end. The coil support 36 supports a coil 38 thereon. The magnetic circuit 28 and the coil 38 which is inserted in a gap in the magnetic circuit 28 jointly make up a voice coil motor (VCM) 40.

A flexible printed circuit (FPC) 42 for transmitting signals from MR elements on the head sliders 32 has one end fixed by a fixing member 44 and is electrically connected to a connector (not shown). The base 14 supports an annular gasket assembly 46 extending on and along an upper edge thereof. The cover 16 is fastened to the base 14 by screws with the annular gasket assembly 46 interposed therebetween, thereby sealing the housing 12.

Figure 2:
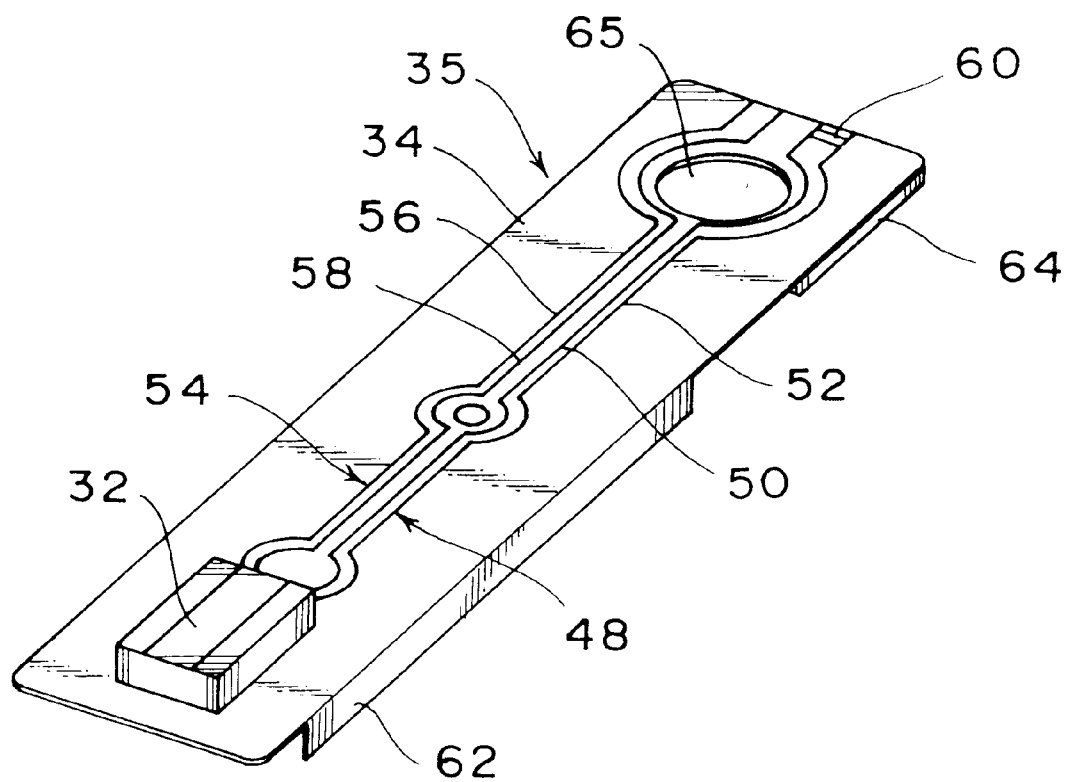
FIG. 2 is a perspective view of each of the head assemblies according to the first embodiment of the present invention.

FIG. 2 shows in perspective each of the head assemblies 35 according to the first embodiment of the present invention. As shown in FIG. 2, the head slider 32, which has an MR head 32a shown in detail in FIG. 3, is mounted on the tip end of the suspension 34 that is made of stainless steel, for example. The suspension 34 has a hole 65 defined in its proximal end for attachment to the actuator arm 30.

As shown in FIG. 3, the MR head 32a has an electrically conductive substrate 66 and a nonmagnetic insulating layer 68 made of alumina ($Al_2O_3$), for example, which is disposed on the electrically conductive substrate 66. First and second magnetic shields 70, 72 made of nickel-iron (Ni—Fe), for example, are embedded in the nonmagnetic insulating layer 68. The first and second magnetic shields 70, 72 define a gap 74 therebetween at a tip end surface 75 (facing the magnetic disk 20) of the head 32a for increasing the resolution.

In the nonmagnetic insulating layer 68, there are also embedded a magnetoresistive element (MR element) 76 made of nickel-iron (Ni—Fe), for example, in spaced relation to the tip end surface 75, and a front flux guide 78 made of nickel-iron (Ni—Fe), for example, and having an end exposed at the tip end surface 75 and an opposite end magnetically coupled to the MR element 76. The front flux guide 78 serves to guide magnetic fluxes from the recording medium (the magnetic disk 20) to the MR element 76.

A rear front flux guide 80 made of nickel-iron (Ni—Fe), for example, is also embedded in the nonmagnetic insulating layer 68 and has an end magnetically coupled to the MR element 76. Although not shown, the MR element 76 has a pair of terminals connected to a sense current source for supplying a constant sense current to the MR element 76.

A magnetic pole 84 embedded in the nonmagnetic insulating layer 68 has an end exposed at the tip end surface 75 and an opposite end coupled to the second magnetic shield 72. A conductor coil 82 is wound substantially around the junction between the magnetic pole 84 and the second magnetic shield 72. When a current modulated with information to be recorded on the magnetic disk 20 is supplied to the conductor coil 82, the conductor coil 82 induces a magnetic field depending on the supplied current for magnetically recording the information on a recording track on the magnetic disk 20.

The MR element 76 is used to read information recorded on the magnetic disk 20. Specifically, a signal magnetic flux from a recording track on the magnetic disk 20 is received by the head 32a and introduced through the front flux guide 78 into the MR element 76, thereby magnetizing the MR element 76. The magnetic flux that has passed through the MR element 76 is absorbed through the rear flux guide 80 into the first and second magnetic shields 70, 72.

The resistance of the MR element 76 varies depending on a change in the magnitude of the signal magnetic flux. Since the MR element 76 is being supplied with a constant sense current from the sense current source, the voltage between the terminals of the MR element 76 varies as the resistance of the MR element 76 varies. Therefore, the information recorded on the magnetic disk 20 can be reproduced as a voltage signal from the MR element 76.

As shown in FIG. 2, an MR wiring pattern 48 comprising a pair of lead lines 50, 52 and a coil wiring pattern 54 comprising a pair of lead lines 56, 78 are printed on the suspension 34. Each of the lead lines 50, 52, 56, 58 is made of copper, for example. The lead lines 50, 52 have ends connected to the terminals of the MR element 76, and the lead lines 56, 58 have ends connected to the coil 82.

Figure 4:
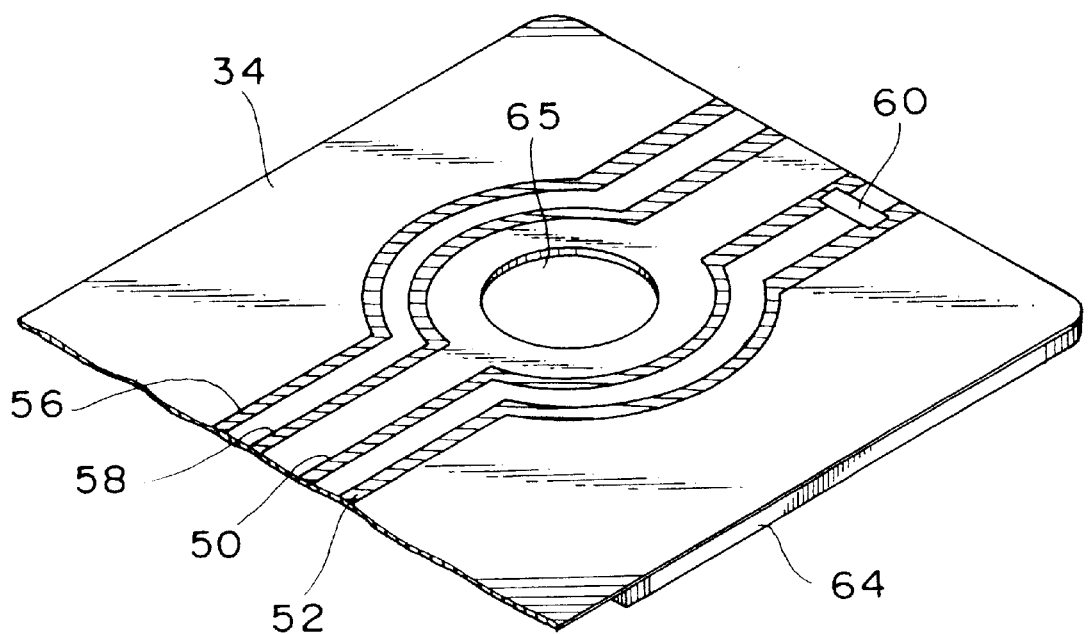
FIG. 4 is an enlarged fragmentary perspective view of the head assembly according to the first embodiment of the present invention.

The suspension 34 has a pair of ribs 62 (only one shown) integrally formed therewith along opposite side edges for increasing the rigidity of the suspension 34. A spacer 64 is fixed by adhesive to the proximal end of the suspension 34. As shown in FIG. 4, the lead lines 50, 52 are connected to each other by an MR short circuit pattern 60. The MR short circuit pattern 60 is made of such a material which can easily be broken after the head assembly 35 is installed on the actuator arm 30.

For example, the MR short circuit pattern 60 is made of a solder material having a low melting point. When the head assembly 35 is assembled in a soldering process, the MR short circuit pattern 60 is also heated, and can be blown off by compressed air or absorbed away under vacuum. Therefore, when the head assembly 35 is assembled, the lead lines 50, 52 are electrically disconnected from each other.

Alternatively, the MR short circuit pattern 60 is made of an alloy having a low melting point. After the head assembly 35 is mounted on the actuator arm 30, a laser beam is applied to the MR short circuit pattern 60 to cut it off. Since the laser beam may be focused into a small spot, it can reliably cut off the MR short circuit pattern 60 even if the suspension 34 is small in size. Such a laser beam cutting process can easily be automatized.

When the head assembly 35 is handled by itself, because the lead lines 50, 52 connected to the MR element 76 are short-circuited by the MR short circuit pattern 60, a current produced due to an electrostatic charge buildup flows through the MR short circuit pattern 60 and is prevented from flowing through the MR element 76. The MR element 76 is thus protected from damage by a current produced due to an electrostatic charge buildup.

Figure 5:
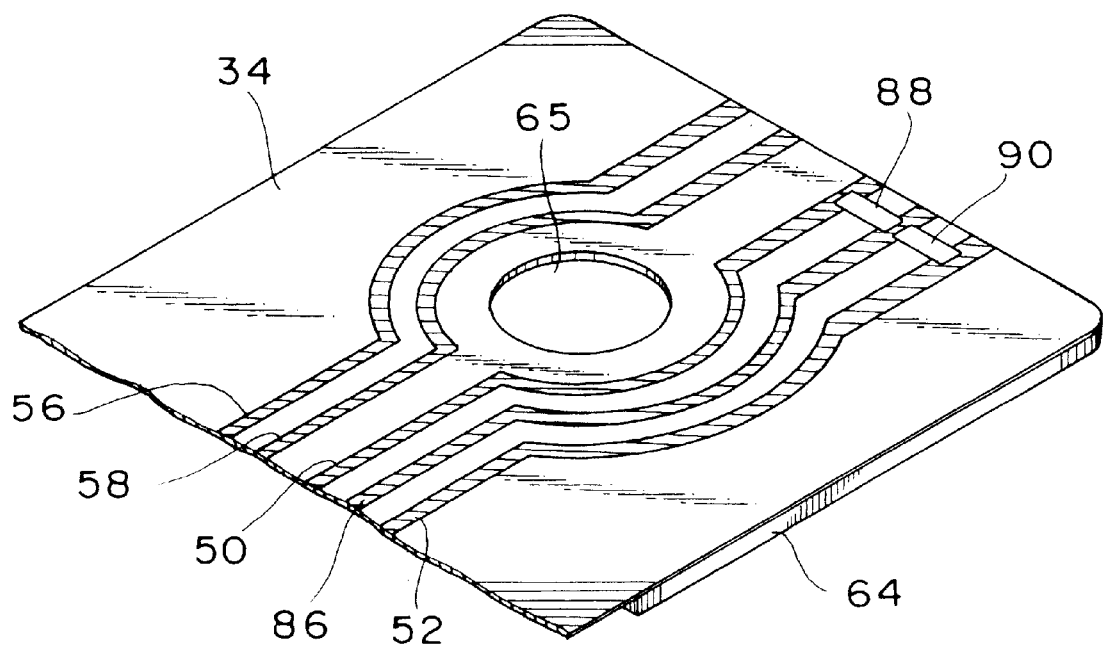
FIG. 5 is an enlarged fragmentary perspective view of a head assembly according to a second embodiment of the present invention.

FIG. 5 shows in enlarged fragmentary perspective a head assembly according to a second embodiment of the present invention. The head assembly according to the second embodiment differs from the head assembly according to the first embodiment in that it additionally has a ground line 86 disposed on the suspension 34 between the lead lines 50, 52 and connecting the first and second magnetic shields 70, 72 to ground. The lead lines 50, 52 are connected to the ground line 86 by respective MR-shield short circuit patterns 88, 90, which are made of such a material which can easily be broken after the head assembly is installed on the actuator arm 30.

Since the lead lines 50, 52 are connected to the ground line 86 by respective MR-shield short circuit patterns 88, 90, a current produced due to an electrostatic charge buildup flows through the MR-shield short circuit patterns 88, 90 and is prevented from flowing through the MR element 76. Electrostatic charges are prevented from being discharged between the MR element 76 and the first and second magnetic shields 70, 72, and hence the MR element 76 is prevented from being burned out.

While the lead lines 50, 52 are connected to the ground line 86 by respective MR-shield short circuit patterns 88, 90 in the second embodiment shown in FIG. 5, the lead lines 50, 52 may be connected to the ground line 86 by a single continuous short circuit pattern.

Figure 6:
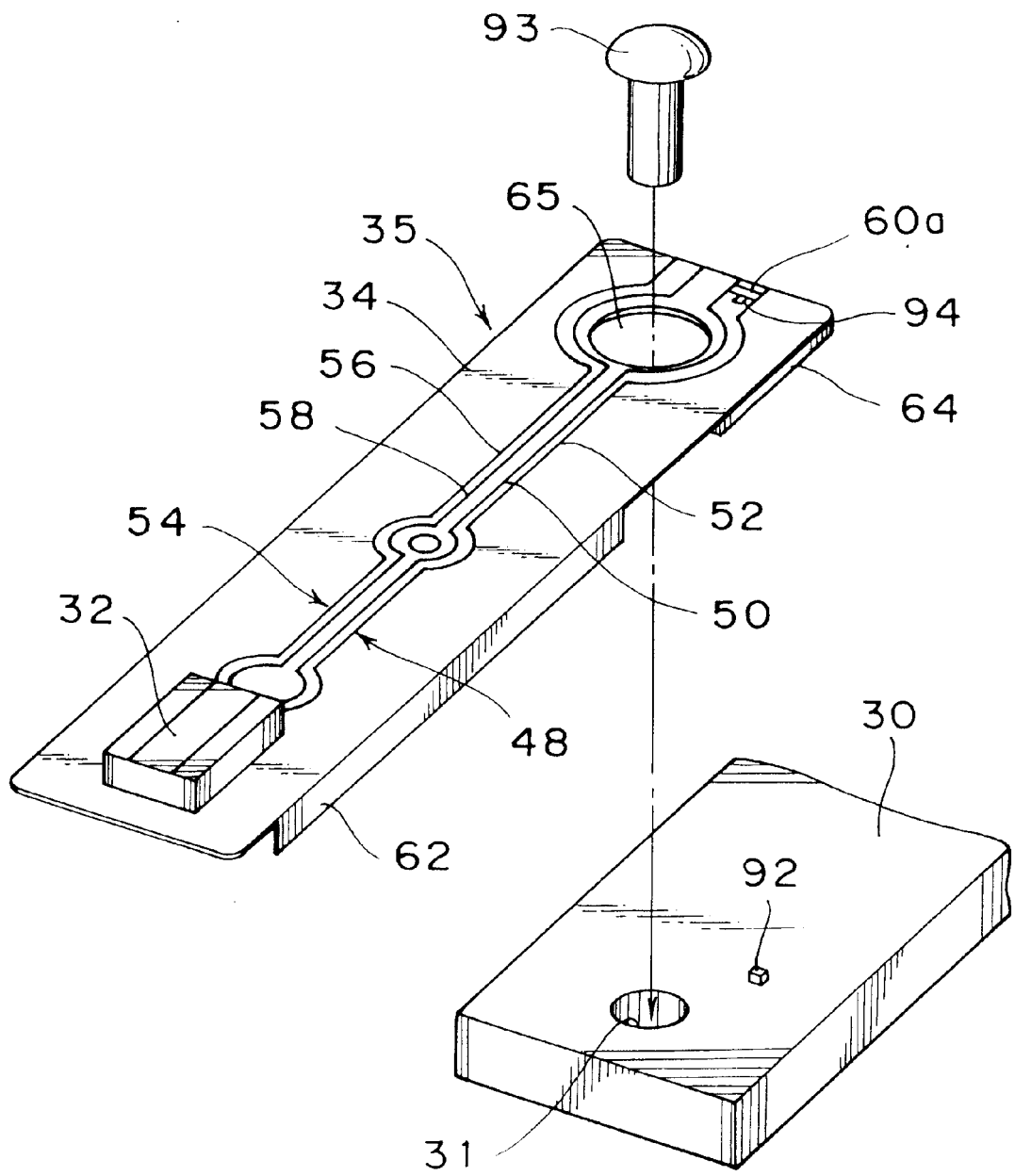
FIG. 6 is a perspective view of a head assembly according to a third embodiment of the present invention.
Figure 7:
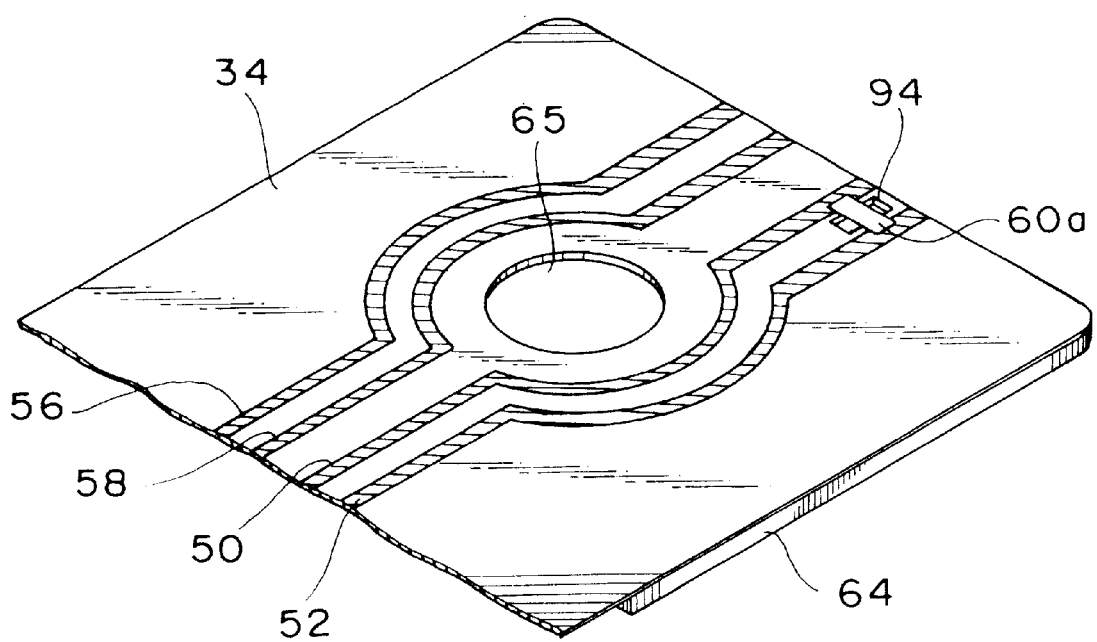
FIG. 7 is an enlarged fragmentary perspective view of the head assembly according to the third embodiment of the present invention.

A head assembly 35 according to a third embodiment of the present invention will be described below with reference to FIGS. 6 and 7. As shown in FIG. 7, the suspension 34 has a hole 94 defined in its proximal end behind a short circuit pattern 60a which interconnects the lead lines 50, 52. As shown in FIG. 6, the actuator arm 30 has a tooth or projection 92 on the distal end thereof for insertion into the hole 94 and a hole 31 defined in the distal end thereof for insertion of a pin 93 for attaching the head assembly 35 to the actuator arm 30.

For fixing the head assembly 35 to the actuator arm 35 according to the third embodiment, the pin 93 is press-fitted through the hole 65 in the suspension 34 into the hole 31 in the actuator arm 30. At this time, since the tooth 92 is inserted into the hole 94 in the suspension 34, the short circuit pattern 60a is broken off by the tooth 92. Therefore, at the same time that the head assembly 35 is installed on the actuator arm 30, the short circuit pattern 60a is automatically broken off by the tooth 92. The head assembly 35 can thus be assembled with ease.

Figure 8:
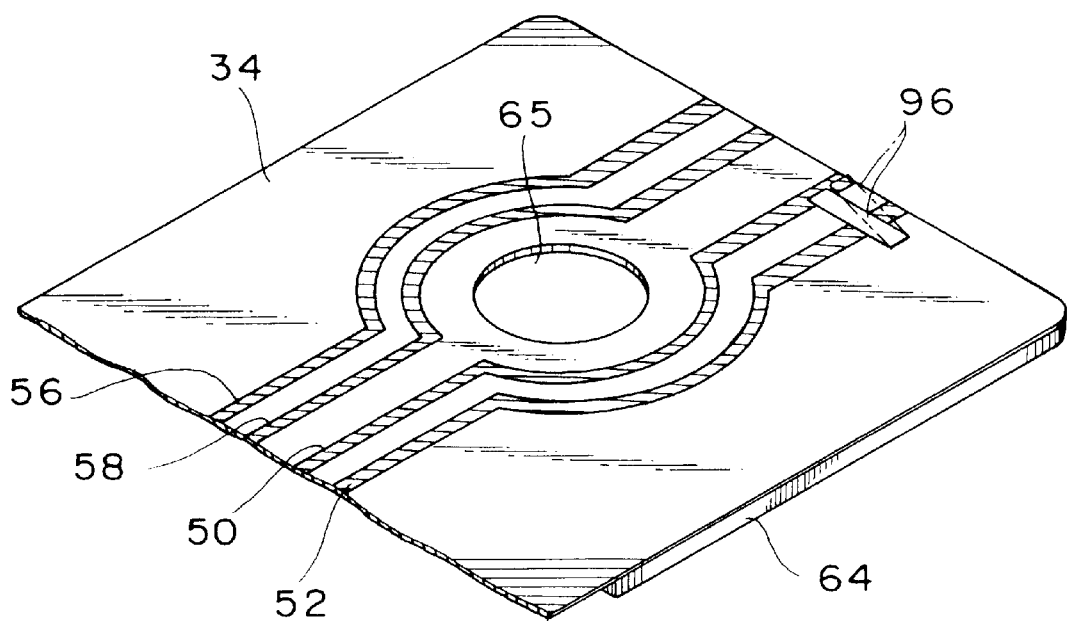
FIG. 8 is an enlarged fragmentary perspective view of a head assembly according to a fourth embodiment of the present invention.

FIG. 8 shows in enlarged fragmentary perspective a head assembly according to a fourth embodiment of the present invention. According to the fourth embodiment, the lead lines 50, 52 are selectively short-circuited and disconnected by a short circuit switch 96. The short circuit switch 96 is made of a bimetal or a shape memory alloy. At a room temperature, the short circuit switch 96 is pressed against the lead lines 50, 52. Although not shown, this embodiment also employs the tooth 92 that can be inserted into the hole 94 according to the third embodiment shown in FIGS. 6 and 7.

The short circuit switch 96 short-circuits the lead lines 50, 52 under normal conditions. However, when the head assembly 35 is installed on the actuator arm 30, the tooth 92 inserted into the hole 94 pushes upwardly the short circuit switch 96 as indicated by the imaginary lines in FIG. 8, thereby electrically disconnecting the lead lines 50, 52.

Figure 9:
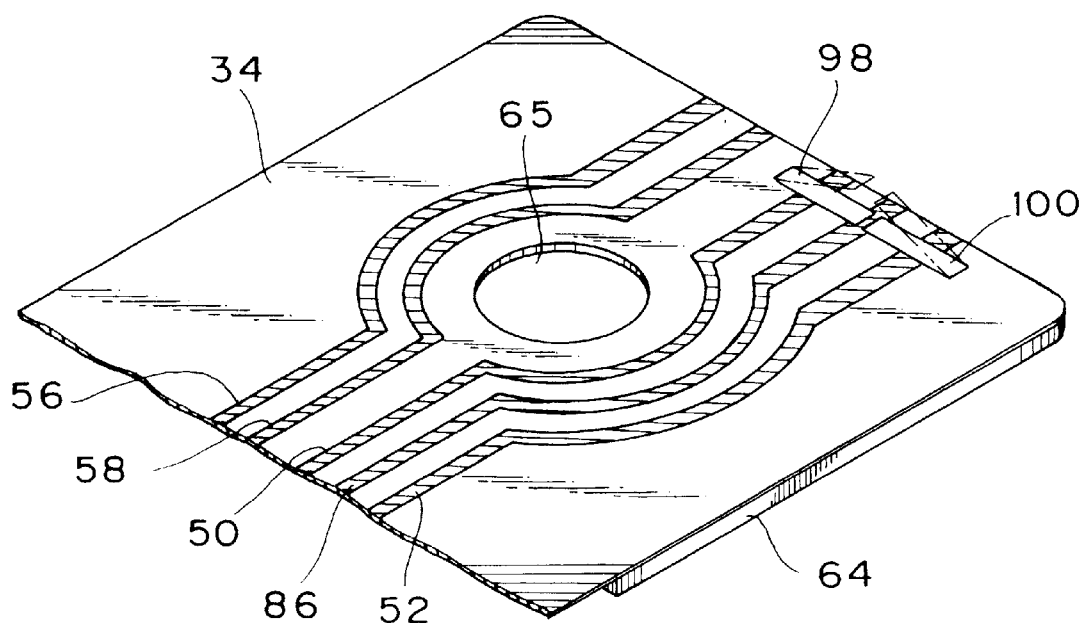
FIG. 9 is an enlarged fragmentary perspective view of a head assembly according to a fifth embodiment of the present invention.

FIG. 9 shows in enlarged fragmentary perspective a head assembly according to a fifth embodiment of the present invention. The head assembly according to the fifth embodiment is similar to the head assembly according to the second embodiment except that the lead lines 50, 52 and the ground line 86 are selectively short-circuited or disconnected by two short circuit switches 98, 100. Each of the short circuit switches 98, 100 is made of a bimetal or a shape memory alloy. At a room temperature, the short circuit switches 98, 100 are pressed against the lead lines 50, 52 and the ground line 86.

Although not shown, this embodiment also employs two teeth on the tip end of the actuator 30 and two holes defined in the suspension 34 behind the respective short circuit switches 98, 100 in a manner similar to the third embodiment shown in FIGS. 6 and 7. When the head assembly 35 is installed on the actuator arm 30, the teeth are inserted into the respective holes, lifting the short circuit switches 98, 100 off the lead lines 50, 52 and the ground line 86, which are thus electrically disconnected from each other.

Figure 10:
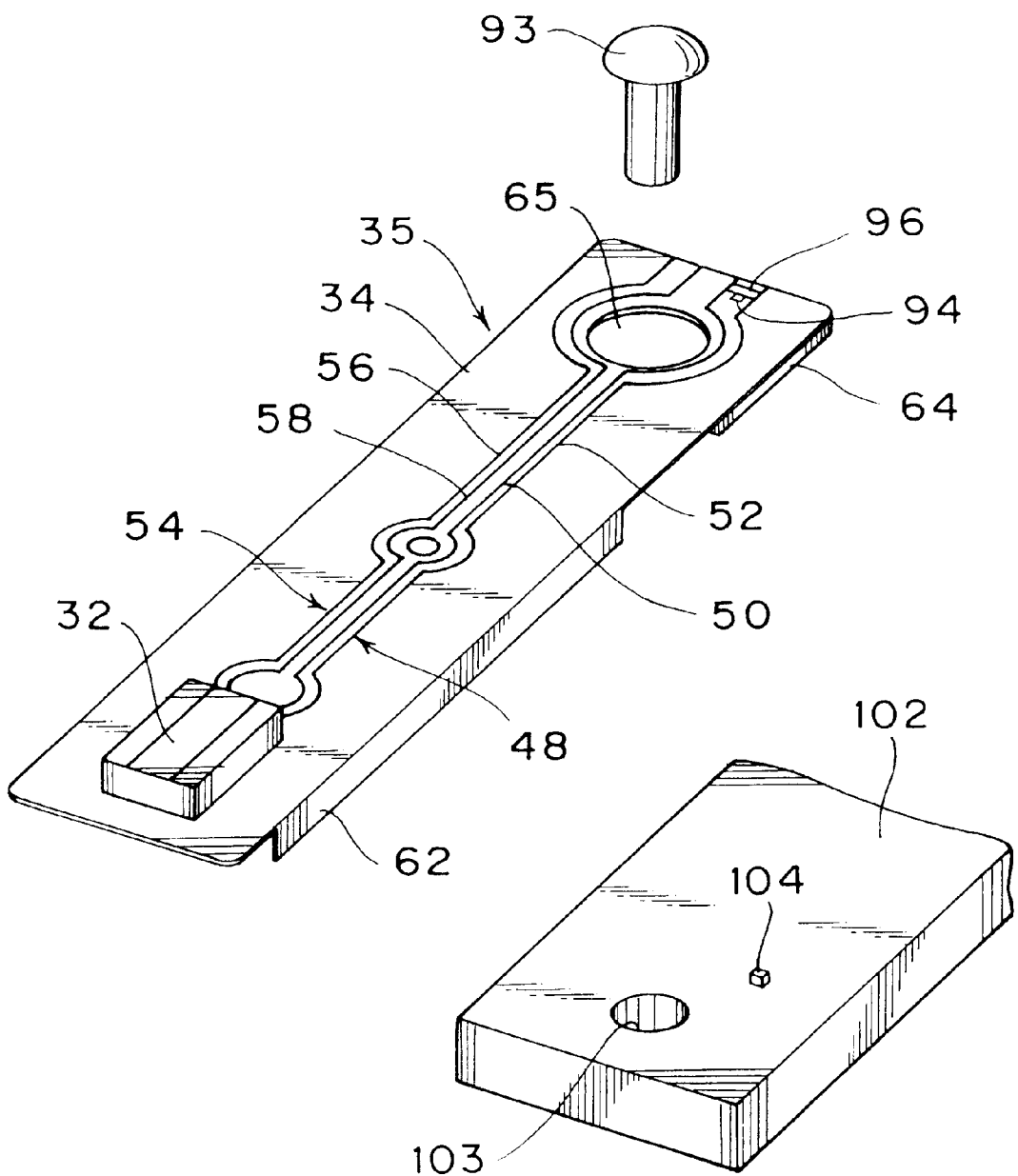
FIG. 10 is a perspective view of a head assembly according to a sixth embodiment of the present invention.
Figure 11:
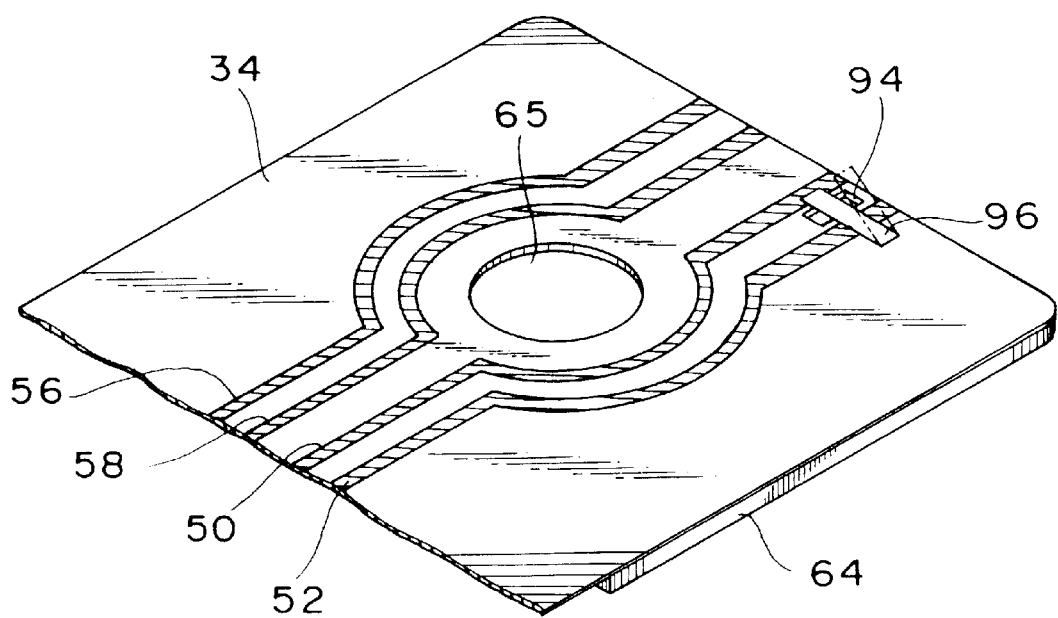
FIG. 11 is an enlarged fragmentary perspective view of the head assembly according to the sixth embodiment of the present invention.

FIG. 10 shows in perspective a head assembly according to a sixth embodiment of the present invention. FIG. 11 shows in enlarged fragmentary perspective the head assembly according to the sixth embodiment of the present invention. As shown in FIG. 10, an inspection arm 102 of the magnetic disk drive has a tooth 104 on the distal end thereof and a hole 103 defined in the distal end thereof for insertion of the pin 93. As shown in FIG. 11, the suspension 34 has a hole 94 defined in the proximal end thereof behind the short circuit switch 96 for insertion of the tooth 104.

Simultaneously with the head assembly 35 is installed on the inspection arm 102, the short circuit switch 96 is lifted off the lead lines 50, 52 by the tooth 104 inserted in the hole 94, thereby electrically disconnecting the lead lines 50, 52 from each other. When the head assembly 35 is detached from the inspection arm 102, the lead lines 50, 52 are short-circuited by the short circuit switch 96 because the tooth 104 is retracted out of the hole 94. Therefore, even when the head assembly 35 needs to be installed and detached repeatedly for inspection until it is finally assembled, the MR element 76 is protected against being burned out.

Figure 12:
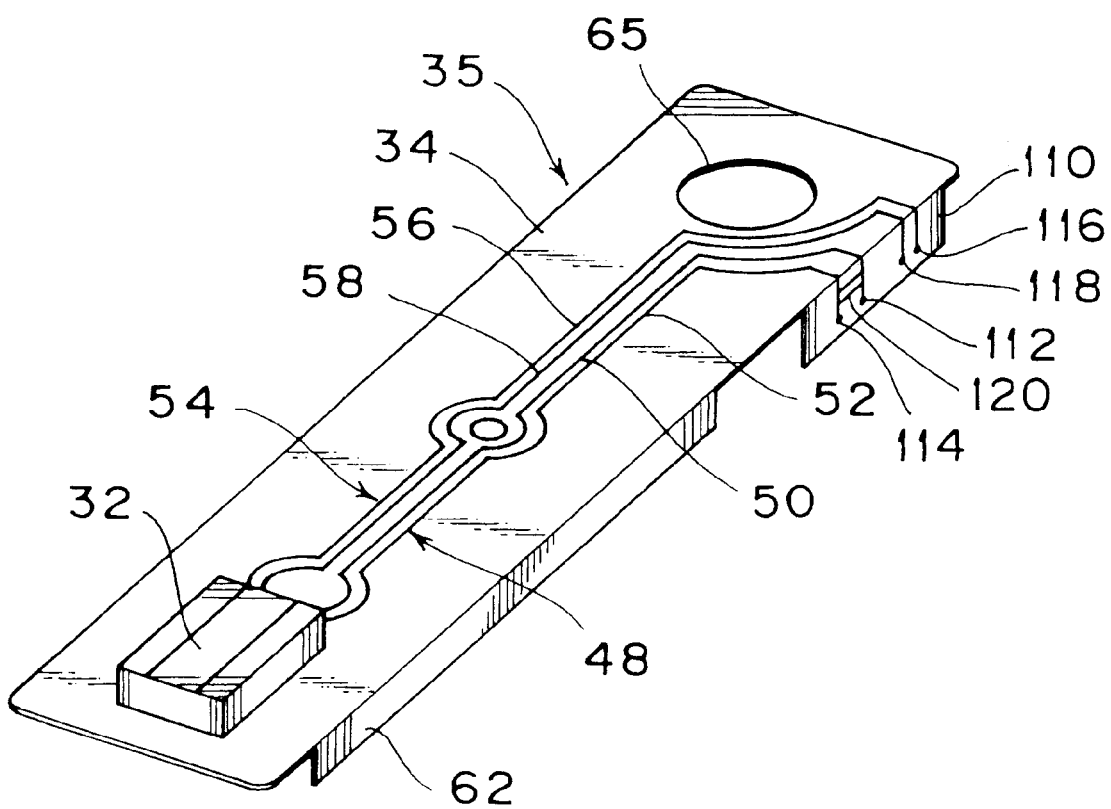
FIG. 12 is a perspective view of a head assembly according to a modification of the first embodiment shown in FIG. 2.

Referring to FIG. 12, there is shown a modification of the first embodiment shown in FIG. 2. In this modification, a tab 110 made of polyimide is suspended from the side edge of the suspension 34 and terminals 112, 114, 116 and 118 connected respectively to the lead lines 50, 52, 56 and 58 are formed on the tab 110. The lead lines 50 and 52 on the tab 110 are connected to each other by an MR short circuit pattern 120. The MR short circuit pattern 120 is made of, for example, solder material having a low meeting point.

According to the modification shown in FIG. 12, since the MR short circuit pattern 1120 is formed on the tab 110 suspended from the side edge of the suspension 34, it is easy to cut off the MR short circuit pattern 120 after a plurality of the head assemblies 35 are mounted on the respective actuator arms 30. In this modification, the terminals 112, 114, 116 and 118 are to be connected to terminals on an interconnection flexible printed circuit sheet which is to be bonded to a side face of the actuator arm 30.

In each of the above embodiments, the present invention has been described with respect to the head assembly whose head slider has the MR element. However, the principles of the present invention are also applicable to a head slider which has a general electromagnetic transducer for preventing the electromagnetic transducer from being adversely affected by electrostatic charge buildups.

With the arrangement of the present invention, as described above, since when the head assembly is handled by itself, the terminals of the MR element and/or the terminals of the MR element and the magnetic shields are electrically short-circuited by the short circuit pattern or the short circuit switch, an excessive current produced due to an electrostatic charge flows through the short circuit pattern or the short circuit switch and is prevented from flowing through the MR element.

Furthermore, inasmuch as the MR element and the magnetic shields are held in substantially the same potential by the short circuit achieved by the short circuit pattern or the short circuit switch, electrostatic charges developed between the MR element and the magnetic shields are prevented from being discharged. As a result, the MR element 76 is prevented from being burned out due to electrostatic charge buildups.

What is claimed is:

1. A head assembly comprising:

a suspension;

a head slider having a magnetoresistive element mounted on a tip end of said suspension;

a pair of lead lines disposed on said suspension and having ends connected to said magnetoresistive element; and a switch disposed on said suspension for selectively connecting said lead lines to each other and disconnecting said lead lines from each other, wherein said switch is made of a bimetal for being held against said lead lines at a room temperature, thereby to connect the lead lines to each other.

2. A head assembly comprising:

a suspension having a surface and proximal and distal ends;

a head slider having a magnetoresistive element, said head slider being mounted on said surface at said distal end of said suspension, and a magnetic shield shielding the magnetoresistive element;

a pair of lead lines disposed on said suspension and having ends connected to said magnetoresistive element;

a ground line disposed on said suspension and having an end connected to said magnetic shield; and a switch disposed on said surface near said proximal end of said suspension, said switch selectively connecting said lead lines to each other and to said ground line and disconnecting said lead lines from each other and from said ground line;

said switch being configured and arranged to be held against said lead lines and said ground line at a room temperature to thereby connect the lead lines to each other and to said ground line, wherein the connection formed by said switch is configured and arranged to be disconnected by a tooth biasing said switch, and further wherein said connection is reformed if said tooth is withdrawn at room temperature.

3. A head assembly according to claim 2, wherein said switch is made of a bimetal.

4. A head assembly according to claim 2, wherein said switch is made of a shape memory metal.

5. A head assembly comprising:

a suspension;

a head slider having an electromagnetic transducer mounted on a tip end of said suspension;

a pair of lead lines disposed on said suspension and having ends connected to said electromagnetic transducer; and a switch disposed on said suspension for selectively connecting said lead lines to each other and disconnecting said lead lines from each other, wherein said switch is made of a bimetal for being held against said lead lines at a room temperature, thereby to connect the lead lines to each other.

6. A suspension for supporting a head slider having an electromagnetic transducer, comprising:

a pair of lead lines disposed on said suspension and having ends adapted to be connected to said electromagnetic transducer; and a switch disposed on said suspension for selectively connecting said lead lines to each other and disconnecting said lead lines from each other, wherein said switch is made of a bimetal for being held against said lead lines at a room temperature, thereby to connect the lead lines to each other.

7. A magnetic disk drive comprising:

a housing;

a magnetic disk rotatably mounted in said housing;

a head slider having a magnetoresistive element for reading data from said magnetic disk; and an actuator for moving said head slider across tracks on said magnetic disk;

said actuator comprising:

an actuator arm rotatably mounted in said housing; and a suspension supporting said head slider on a tip end thereof and having a proximal end fixed to a tip end of said actuator;

said actuator arm having a tooth on the tip end thereof, said suspension having a pair of lead lines having respective ends connected to said magnetoresistive element, a hole defined therein for insertion of said tooth therein, and a short circuit pattern for normally short-circuiting said lead lines, said short circuit pattern being breakable by said tooth when said tooth is inserted into said hole, thereby electrically disconnecting said lead lines from each other.

8. A magnetic disk drive according to claim 7, wherein said head slider has a magnetic shield shielding said magnetoresistive element, said suspension having a ground line connected to said magnetic shield and normally short-circuited to said lead lines by said short circuit pattern, said short circuit pattern being breakable by said tooth when said tooth is inserted into said hole, thereby electrically disconnecting said lead lines from each other and from said ground line.

9. A magnetic disk drive comprising:

a housing;

a magnetic disk rotatably mounted in said housing;

a head slider having a magnetoresistive element for reading data from said magnetic disk; and an actuator for moving said head slider across tracks on said magnetic disk;

said actuator comprising:

an actuator arm rotatably mounted in said housing; and a suspension supporting said head slider on a tip end thereof and having a proximal end fixed to a tip end of said actuator;

said actuator arm having a tooth on the tip end thereof, said suspension having a pair of lead lines having respective ends connected to said magnetoresistive element, a hole defined therein for insertion of said tooth therein, and a short circuit switch for normally short-circuiting said lead lines, said short circuit switch being displaceable by said tooth when said tooth is inserted into said hole, thereby electrically disconnecting said lead lines from each other.

10. A magnetic disk drive according to claim 9, wherein said head slider has a magnetic shield shielding said magnetoresistive element, said suspension having a ground line connected to said magnetic shield and normally short-circuited to said lead lines by said short circuit switch, said short circuit switch being displaceable by said tooth when said tooth is inserted into said hole, thereby electrically disconnecting said lead lines from each other and from said ground line.

11. A head assembly comprising:

a suspension having a proximal end, a distal end, and two side edges, wherein each side edge extends substantially between said proximal end and said distal end;

a head slider having a magnetoresistive element, said head slider being mounted on said distal end of said suspension;

a pair of lead lines disposed on said suspension and having ends connected to said magnetoresistive element;

a tab suspended from one of said side edges of said suspension, said tab being located adjacent to said proximal end of said suspension, said tab having a pair of lead lines each connected to said respective lead lines on said suspension and a pair of terminals each connected to said respective lead lines on said tab; and a short circuit pattern disposed on said tab and connecting said lead lines on said tab to each other.

12. A head assembly comprising:

a suspension having a proximal end, a distal end, and two side edges, wherein each side edge extends substantially between said proximal end and said distal end;

a head slider having an electromagnetic transducer, said head slider being mounted on said distal end of said suspension;

a pair of lead lines disposed on said suspension and having ends connected to said electromagnetic transducer;

a tab suspended from one of said side edges of said suspension, said tab being located adjacent to said proximal end of said suspension, said tab having a pair of lead lines each connected to said respective lead lines on said suspension and a pair of terminals each connected to said respective lead lines on said tab; and a short circuit pattern disposed on said tab and connecting said lead lines on said tab to each other.

* * * * *

UNITED STATES PATENT AND TRADEMARK OFFICE
CERTIFICATE OF CORRECTION

PATENT NO. : 5,991,121
DATED : November 23, 1999
INVENTOR(S) : Kanda

It is certified that error appears in the above-indentified patent and that said Letters Patent is hereby corrected as shown below:

On the Title Page Under "[22] Filed:" please delete "Aug. 4, 1997" and insert --August 1, 1997-- therefor Signed and Sealed this Tenth Day of April, 2001

Attest:

NICHOLAS P. GODICI

*Attesting Officer*   *Acting Director of the United States Patent and Trademark Office*